United States Patent
Mizuno

(10) Patent No.: US 12,073,996 B2
(45) Date of Patent: Aug. 27, 2024

(54) CERAMIC ELECTRONIC DEVICE, POWDER MATERIAL, PASTE MATERIAL, AND MANUFACTURING METHOD OF CERAMIC ELECTRONIC DEVICE

(71) Applicant: TAIYO YUDEN CO., LTD., Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 158 days.

(21) Appl. No.: 17/678,917

(22) Filed: Feb. 23, 2022

(65) Prior Publication Data

US 2022/0277897 A1  Sep. 1, 2022

(30) Foreign Application Priority Data

Mar. 1, 2021 (JP) ................................. 2021-032057
Mar. 1, 2021 (JP) ................................. 2021-032058

(51) Int. Cl.
*H01G 4/008* (2006.01)
*B22F 1/05* (2022.01)
*C22C 19/03* (2006.01)
*H01G 4/30* (2006.01)

(52) U.S. Cl.
CPC ............... *H01G 4/008* (2013.01); *B22F 1/05* (2022.01); *C22C 19/03* (2013.01); *H01G 4/30* (2013.01); *B22F 2301/15* (2013.01); *B22F 2304/05* (2013.01)

(58) Field of Classification Search
CPC .......... H01G 4/30; H01G 4/005; H10G 4/008; C22C 19/03; B22F 1/05
USPC .................................. 361/301.4, 303, 321.1
See application file for complete search history.

(56) References Cited

U.S. PATENT DOCUMENTS

| | | | |
|---|---|---|---|
| 2007/0125195 A1* | 6/2007 | Akimoto | H01G 4/0085 75/252 |
| 2007/0223177 A1 | 9/2007 | Ito et al. | |
| 2013/0321980 A1* | 12/2013 | Suzuki | H01G 4/30 29/25.42 |
| 2019/0304696 A1* | 10/2019 | Kim | H01G 4/12 |
| 2020/0066452 A1* | 2/2020 | Cha | H01G 4/30 |
| 2020/0066454 A1* | 2/2020 | Cha | H01G 4/0085 |
| 2020/0090873 A1* | 3/2020 | Kwon | H01G 4/0085 |

FOREIGN PATENT DOCUMENTS

| | | |
|---|---|---|
| JP | 2003129116 A | 5/2003 |
| JP | 2007258646 A | 10/2007 |
| JP | 2014005491 A | 1/2014 |
| JP | 2019004021 A * | 1/2019 |

\* cited by examiner

*Primary Examiner* — Arun Ramaswamy
(74) *Attorney, Agent, or Firm* — Law Office of Katsuhiro Arai

(57) ABSTRACT

A ceramic electronic device includes a multilayer chip in which each of a plurality of dielectric layers of which a main component is ceramic, and each of a plurality of internal electrode layers are alternately stacked. The plurality of internal electrode layers include Ni, S and Sn.

14 Claims, 7 Drawing Sheets

CERAMIC ELECTRONIC DEVICE, POWDER MATERIAL, PASTE MATERIAL, AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2021-032057, filed on Mar. 1, 2021 and the prior Japanese Patent Application No. 2021-032058, filed on Mar. 1, 2021, the entire contents of which are incorporated herein by reference.

FIELD

A certain aspect of the present disclosure relates to a ceramic electronic device, a powder material, a paste material, and a manufacturing method of a ceramic electronic device.

BACKGROUND

Ceramic electronic devices such as multilayer ceramic capacitors are made by printing each of metal paste including a metal material such as nickel (Ni), on each of dielectric green sheets of which a main material is a dielectric material such as barium titanate, stacking the dielectric green sheets, crimping the multilayer structure, cutting the multilayer structure, removing a binder from the multilayer structure, firing the multilayer structure, and applying external electrodes. From a viewpoint of downsizing the ceramic electronic devices and enlarging capacity of the ceramic electronic devices, it is favorable that thicknesses of internal electrode layers are reduced and the number of the stacked layers is enlarged, as well as reducing thicknesses of dielectric layers.

SUMMARY OF THE INVENTION

According to a first aspect of the embodiments, there is provided a ceramic electronic device including: a multilayer chip in which each of a plurality of dielectric layers of which a main component is ceramic, and each of a plurality of internal electrode layers are alternately stacked, wherein the plurality of internal electrode layers include Ni, S and Sn.

According to a second aspect of the embodiments, there is provided a manufacturing method of a ceramic electronic device including: forming a plurality of stack units by forming each of a plurality of internal electrode patterns on each of a plurality of dielectric green sheets, the each of the internal electrode patterns being a conductive paste including Sn, S and Ni, the plurality of dielectric green sheets including a ceramic material powder and an organic binder; forming a multilayer structure by stacking the plurality of stack units; and firing the multilayer structure.

According to a third aspect of the embodiments, there is provided a powder material including: a Ni powder including Sn; and a S source, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

According to a fourth aspect of the embodiments, there is provided a paste material including: a Ni powder including Sn; and a S source, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

According to a fifth aspect of the embodiments, there is provided a manufacturing method of a ceramic electronic device including: forming a plurality of multilayer units by forming each of internal electrode patterns on each of dielectric green sheets, the each of internal electrode patterns including a Ni powder including Sn and a S source, the each of dielectric green sheet including a ceramic material powder and an organic binder; forming a multilayer structure by stacking the plurality of multilayer units; and firing the multilayer structure, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

DETAILED DESCRIPTION

From a viewpoint of reducing the thicknesses of internal electrode layers, it is favorable that a physical size of particles of metal powder before firing is decreased as much as possible (for example, see Japanese Patent Application Publication No. 2003-129116). However, when base metal particles such as Ni are used, an amount of surface oxygen increases as the size of the base metal particles decreases. When the amount of the surface oxygen increases, progress of removing the binder caused by the surface oxygen becomes negligible. A crack caused by removing of the binder frequently occurs. This may be a problem.

There is known that sulfur (S) is added in order to suppress reduction of a surface oxygen (for example, see Japanese Patent Application Publication No. 2014-005491). However, when an amount of S is large, rapid contraction may occur during desorption of S. In this case, a crack may occur. Alternatively, reduction degree of the atmosphere increases because of the combustion reaction of S. Grain growth of a co-material and the dielectric material is accelerated. And, a continuity modulus of the internal electrode layers may be degraded.

Hereinafter, an exemplary embodiment will be described with reference to the accompanying drawings.

Exemplary Embodiment

Figure 1:
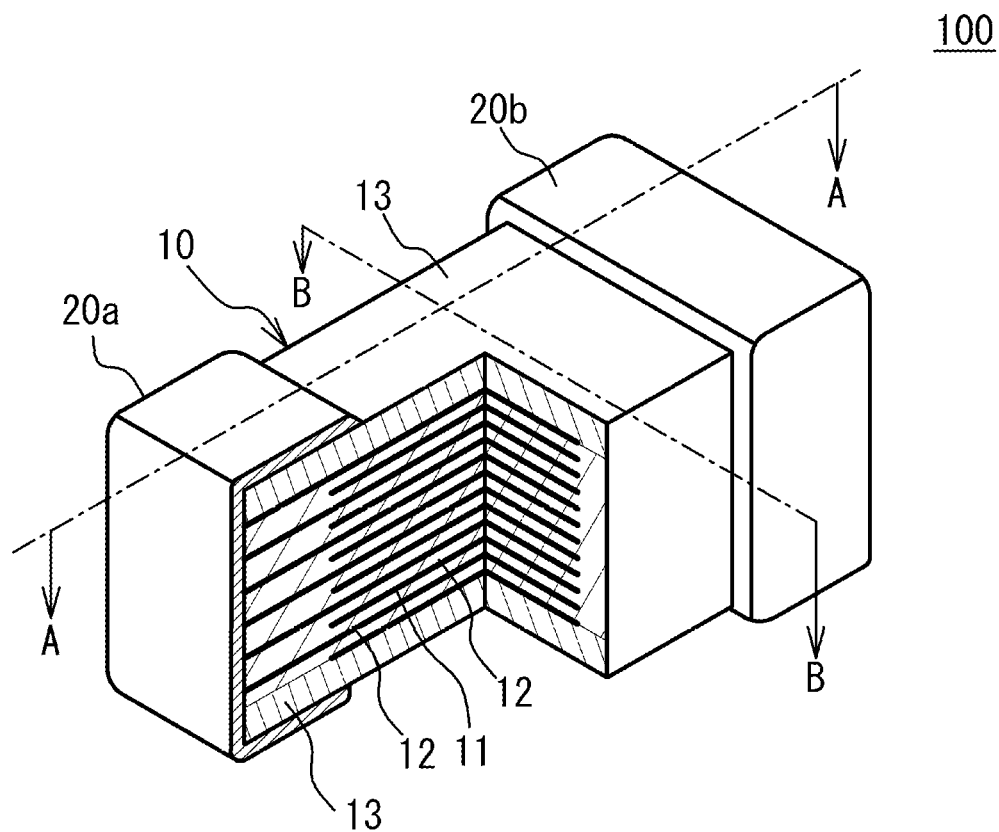
FIG. 1 is a partial cross-sectional perspective view of a multilayer ceramic capacitor.
Figure 2:
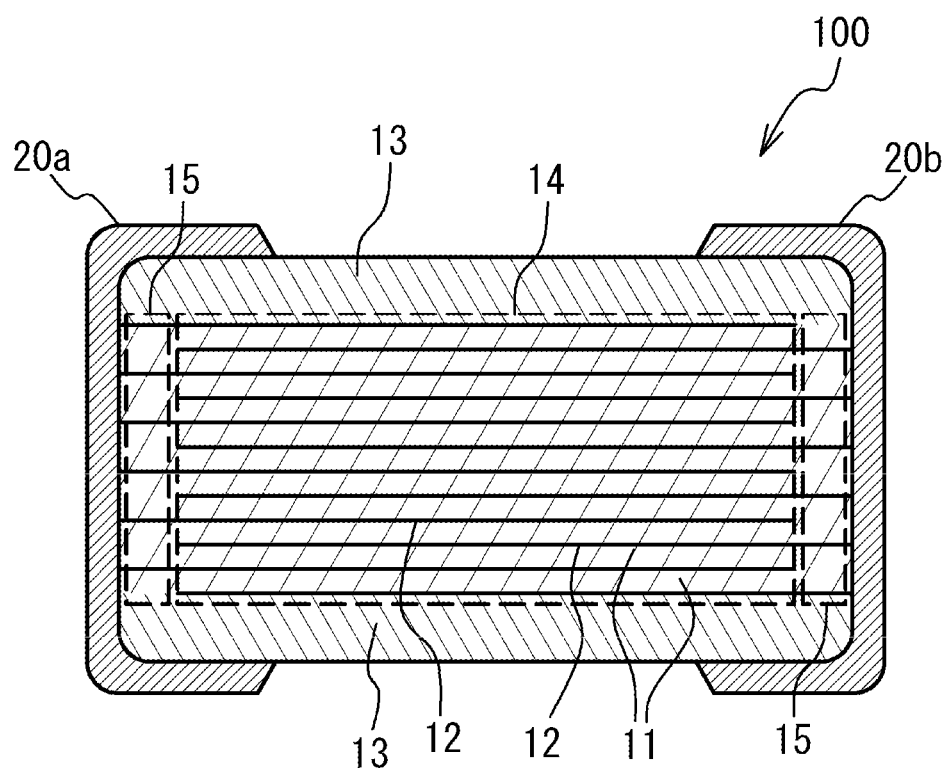
FIG. 2 is a cross-sectional view taken along line A-A in FIG. 1.
Figure 3:
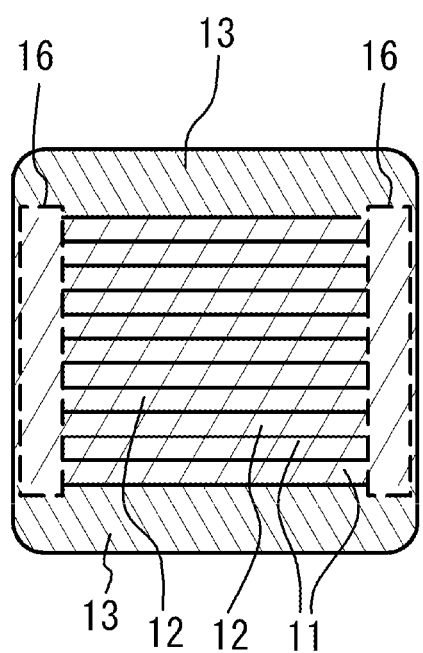
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. A main component of the internal electrode layers 12 is Ni (nickel). End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layers 11 is a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq 1$, $0 \leq y \leq 1$, $0 \leq z \leq 1$) having a perovskite structure. A thickness of each of the dielectric layers 11 may be 0.05 μm or more and 5 μm or less. The thickness may be 0.1 μm or more and 3 μm or less. The thickness may be 0.2 μm or more and 1 μm or less.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

The dielectric layers 11 may be formed by firing the dielectric material including the ceramic material powder, the organic binder and so on. The internal electrode layers 12 may be formed by firing the paste material including the powder material including Ni powder, a co-material, and so on. It is favorable that the physical size of the Ni powder particles for forming the internal electrode layer 12 is reduced as much as possible, in order to reduce the thickness of each of the internal electrode layers 12. However, when the Ni powder has a small diameter, the surface area of the Ni powder becomes large. When the surface area becomes large, an absolute amount of the surface oxygen film the Ni powder becomes large. When the amount of oxygen (O) with respect to Ni is large in the Ni powder, the oxygen promotes the oxidizing of the binder in the dielectric material. In this case, the crack caused by removing of the binder frequently occurs. This may be problem. The crack caused by removing of the binder is a crack caused by contraction caused by promoting of removing of the binder. The amount of oxygen with respect to Ni is a weight ratio of oxygen on a presumption that the amount of Ni+O is 100 mass %.

It is known that sulfur (S) is added to the paste material in order to suppress reduction of the Ni powder. However, when the amount of S with respect to Ni is large, rapid contraction occurs during desorption of S and a crack may occur. Because of combustion reaction of S, reduction degree of the atmosphere increases. In this case, grain growth of the co-material and the ceramic material powder is accelerated. And, the continuity modulus of the internal electrode layer 12 may be degraded.

The multilayer ceramic capacitor 100 has a structure for suppressing occurrence of the crack and keeping a high continuity modulus of the internal electrode layer 12.

The internal electrode layers 12 include Ni, S and Sn (tin). As mentioned above, when the internal electrode layers 12 include S, oxidation of the binder during the firing process is suppressed. It is therefore possible to suppress the crack caused by removing of the binder. Moreover, when the internal electrode layers 12 include Sn, a sulfide which includes Sn and is more stable than the Ni sulfide is formed. In this case, the combustion reaction of S is suppressed. The rapid contraction caused by desorption of S is suppressed. And, the occurrence of the crack is suppressed. When the rapid contraction caused by desorption of S is suppressed, increasing of the reduction degree of the atmosphere is suppressed. The grain growth of the ceramic material powder or the co-material is suppressed. It is therefore possible to keep the high continuity modulus of the internal electrode layers 12. Accordingly, it is possible to suppress the occurrence of the crack and keep the high continuity modulus of the internal electrode layers 12.

The structure including S in the internal electrode layers 12 is not limited. For example, the internal electrode layers 12 may include S in the form of NiS (nickel sulfide), $NiSO_4$ (nickel sulfate) or the like. The structure including Sn in the internal electrode layers 12 is not limited. For example, the internal electrode layers 12 may include Sn in the form of Ni—Sn alloy, $BaSnO_3$ (barium stannate) or the like.

Figure 4A:
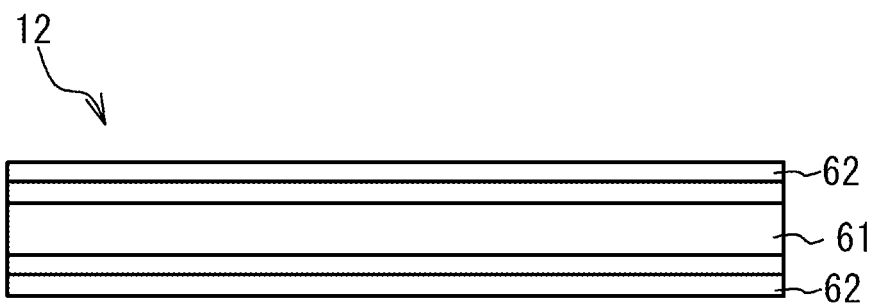
FIG. 4A to FIG. 4C illustrate a positional relationship in an internal electrode layer.

When S is desorbed during the firing process, S tends to be segregated near the interface between the dielectric layer 11 and the internal electrode layer 12. It is therefore preferable that Sn is also segregated near the interface between the dielectric layer 11 and the internal electrode layer 12. For example, as illustrated in FIG. 4A, the internal electrode layer 12 has a Ni layer 61 of which a main component is Ni, in the center portion in the thickness direction. The internal electrode layer 12 has a high concentration portion 62 on the side of the dielectric layer 11 from the Ni layer 61. The high concentration portion 62 has a higher S concentration and a higher Sn concentration than that of the Ni layer 61. It is possible to effectively suppress the desorption of S which is segregated at the surface of the internal electrode layer 12, because the Sn concentration of the high concentration portion 62 is high. Thus, the rapid desorption of S is suppressed. The high concentration portion 62 may include NiS (nickel sulfide), $NiSO_4$ (nickel sulfate), Ni—Sn alloy, $BaSnO_3$ (barium stannate) or the like.

Figure 4B:
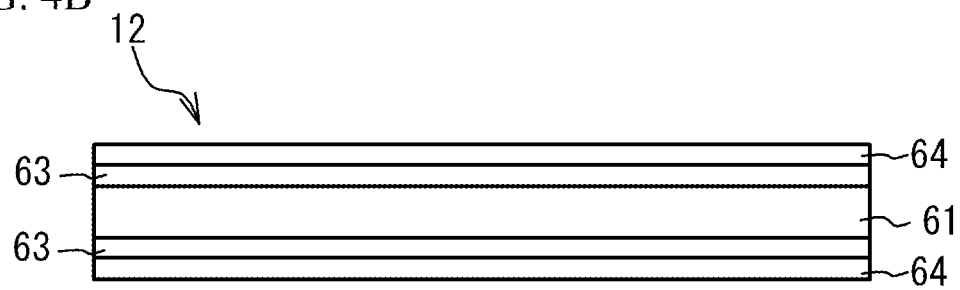

Alternatively, as illustrated in FIG. 4B, the internal electrode layer 12 includes the Ni layer 61 in the center portion in the thickness direction. The internal electrode layer 12 has a high S concentration portion 63 on the side of the dielectric layer 11 from the Ni layer 61. The high S concentration portion 63 has a higher S concentration than that of the Ni layer 61. Moreover, the internal electrode layer 12 has a high Sn concentration portion 64 on the side of the dielectric layer 11 from the high S concentration portion 63. The high Sn concentration portion 64 has a higher Sn concentration than that of the high S concentration portion 63. It is possible to effectively suppress the desorption of S, because the high Sn concentration portion 64 is closer to the dielectric layer 11 than the high S concentration portion 63. The high S concentration portion 63 may include NiS (nickel sulfide), $NiSO_4$ (nickel sulfate) or the like. The high Sn concentration portion 64 may include Ni—Sn alloy, $BaSnO_3$ (barium stannate) or the like.

Figure 4C:
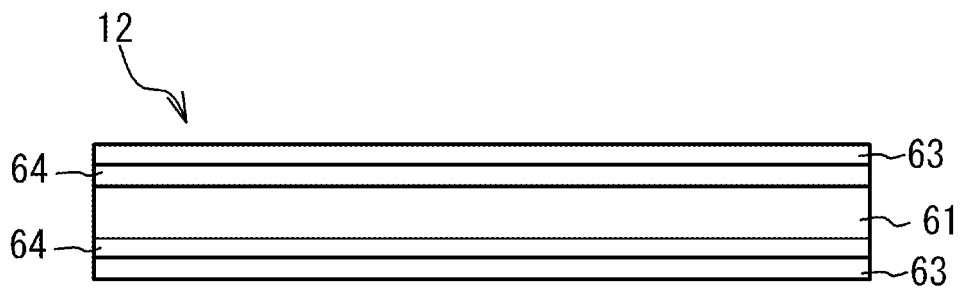

Alternatively, as illustrated in FIG. 4C, the high Sn concentration portion 64 may be located on the side of the dielectric layer 11 from the Ni layer 61, and the high S concentration portion 63 may be located on the side of the dielectric layer 11 from the high Sn concentration portion 64. In this case, it is possible to suppress the desorption of S of the high S concentration portion 63 because of Sn of the high Sn concentration portion 64.

It is possible to measure the positions of the Ni layer 61, the high concentration portion 62, the high S concentration portion 63 and the high Sn concentration portion 64 by using nano-SIMS. For example, the thickness of the Ni layer 61 is 30% or more of the thickness of the internal electrode layer 12.

Figure 5:
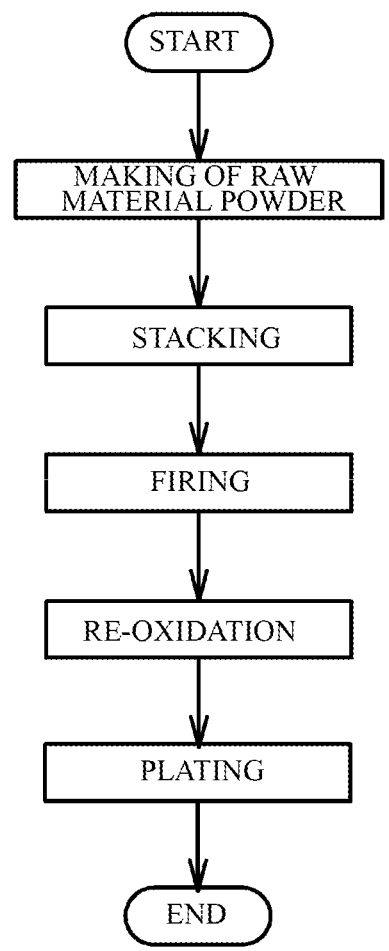
FIG. 5 is a flowchart of a method of manufacturing a multilayer ceramic capacitor.

Next, the manufacturing method of the multilayer ceramic capacitor 100 will be described. FIG. 5 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium), or Yb (ytterbium)), or an oxide of cobalt (Co), Ni (nickel), lithium (Li), B (boron), sodium (Na), potassium (K) or Si (silicon), or glass including cobalt, nickel, lithium, boron, sodium, potassium or silicon.

For example, a compound including an additive is wet-blended with the resulting ceramic material powder. The resulting ceramic material powder is dried and crushed. For example, the resulting ceramic material is crushed if necessary. Thus, a particle diameter is adjusted. Alternatively, the particle diameter may be further adjusted by a classification process. Thus, a dielectric material is obtained.

(Stacking Process)

Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 6A:
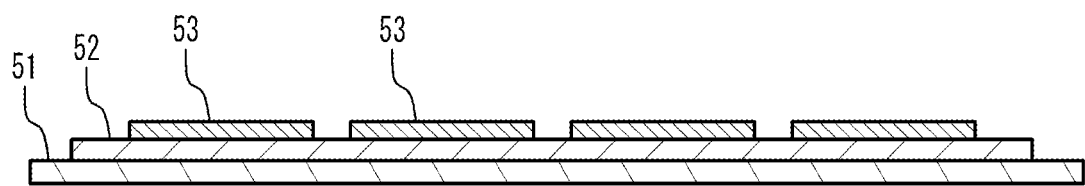
FIG. 6A and FIG. 6B illustrate a stacking process.

Next, as illustrated in FIG. 6A, an internal electrode pattern 53 is formed on the dielectric green sheet 52 by printing a paste material for forming the internal electrode layer 12. In FIG. 6A, as an example, four parts of the internal electrode pattern 53 are formed on the dielectric green sheet 52 and are spaced from each other. The dielectric green sheet 52 on which the internal electrode pattern 53 is formed is a stack unit. The paste material may include ceramic particles as a co-material. The main component of the ceramic particles is not limited. It is preferable that the main component of the ceramic particles is the same as the main component ceramic of the dielectric layers 11. For example, $BaTiO_3$ of which an average particle diameter is 50 nm or less may be evenly dispersed.

Figure 6B:
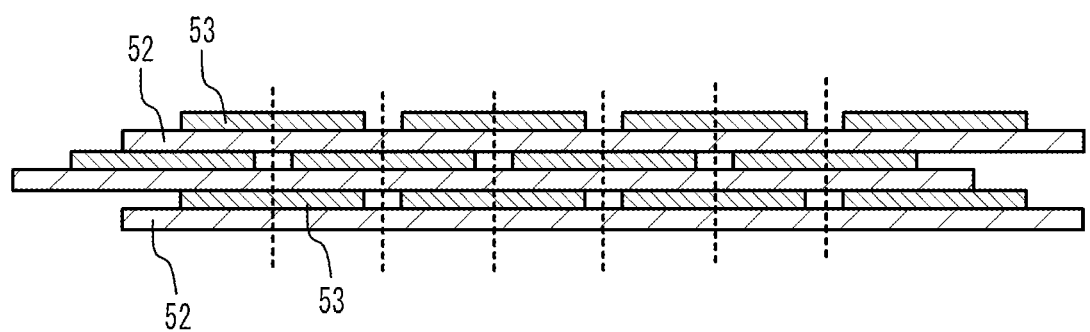

Next, the dielectric green sheets 52 are peeled from the base materials 51. As illustrated in FIG. 6B, the stack units are stacked. Next, a predetermined number (for example, 2 to 10) of a cover sheet is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 6B, the multilayer structure is cut along a dotted line. The components of the cover sheet may be the same as those of the dielectric green sheet 52. Additives of the cover sheet may be different from those of the dielectric green sheet 52.

(Firing Process)

The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing Process)

After that, a re-oxidizing process may be performed in $N_2$ gas atmosphere in a temperature range of 600 degrees C. to 1000 degrees C.

(Plating Process)

After that, by a plating method, metal layers such as Cu, Ni, Sn or the like may be plated on the external electrodes 20a and 20b. In this manner, it is possible to manufacture the multilayer ceramic capacitor 100.

[Details of Paste Material]

In the embodiment, each thickness of the internal electrode layers 12 is reduced in order to enlarge the number of the stacked internal electrode layers 12. For example, the thickness of each of the internal electrode layers 12 may be 1 μm or less. The thickness of each of the internal electrode layers 12 may be 0.4 μm or less. The thickness of each of the internal electrode layers 12 may be 0.2 μm or less. In order to reduce the thickness of the internal electrode layer 12, the Ni powder of the paste material for forming the internal electrode layers 12 has a small particle diameter. For example, an average particle diameter of the Ni powder may be 0.01 μm to 0.2 μm. The average particle diameter of the Ni powder may be 0.03 μm to 0.15 μm. The average particle diameter of the Ni powder may be 0.05 μm to 0.11 μm.

When the Ni powder has a small particle diameter, the surface area of the Ni powder becomes large. Thus, an absolute amount of the surface oxidized film of the Ni powder becomes large. Accordingly, it is preferable that the amount of oxygen in the Ni powder is 2 mass % or more. It is more preferable that the amount of oxygen in the Ni powder is 2.5 mass % or more. In this case, it is possible to use Ni powder having sufficiently small particle diameter. And it is possible to enlarge the continuity modulus of the internal electrode layers 12 after the firing.

In order to suppress oxidizing of the binder caused by the oxygen in the Ni powder, the paste material includes an S source. Thus, reduction of the Ni powder is suppressed, and the oxidizing of the binder is suppressed. It is therefore possible to suppress the occurrence of the crack.

The Ni powder includes an Sn source. The Sn source may be added to micro particles of Ni. Alternatively, Ni—Sn alloy powder may be used as the Ni powder. When Sn is added, a sulfide which includes Sn and is more stable than the Ni sulfide is formed. Therefore, the combustion reaction of S is suppressed. The rapid contraction occurs during rapid desorption of S is suppressed. The reduction degree of the atmosphere is suppressed. In this case, grain growth of the ceramic material powder or the co-material is suppressed. It is therefore possible to keep the high continuity modulus of the internal electrode layers 12.

A paste material including Sn, S and Ni may be used as the paste material.

When the amount of Sn with respect to the amount of S in the paste material is excessively small, sufficient combustion reaction of S may not be necessarily achieved. Accordingly, it is preferable that a weight ratio of S/Sn has an upper limit. In concrete, it is preferable that the weight ratio of S/Sn is 5.5 or less. It is more preferable that the weight ratio of S/Sn is 5 or less.

When the amount of Sn with respect to the amount of O in the paste material is excessively small, the crack caused by removing of the binder may occur because the progressing of the removing of the binder caused by the surface oxygen becomes non-negligible. Accordingly, it is preferable that the weight ratio of O/Sn has an upper limit. In concrete, it is preferable that the weight ratio of O/Sn is 40 or less. It is more preferable that the weight ratio of O/Sn is 30 or less.

A liquid phase may appear in the internal electrode layer 12 in the firing process, spheroidizing may occur in the internal electrode layer 12, and the continuity modulus of the internal electrode layer 12 may be degraded, when the amount of Sn of the paste material is excessively large. Accordingly, it is preferable that the weight ratio of S/Sn has a lower limit. In concrete, it is preferable that the weight ratio of S/Sn is 0.042 or more. It is more preferable that the weight ratio of S/Sn is 0.08 or more. Moreover, it is preferable that the weight ratio of O/Sn has a lower limit. In concrete, it is preferable that the weight ratio of O/Sn is 0.39 or more. It is more preferable that the weight ratio of O/Sn is 0.6 or more.

The paste material is obtained, when the additive is added to the powder material including Ni powder. The amount of the oxygen (O) in the Ni powder is 2 mass % or more with respect to Ni in the powder material. Moreover, the powder material may satisfy the relationships of 0.042≤weight ratio of S/Sn≤5.5 and 0.39≤weight ratio of O/Sn≤40. In this case, the paste material obtained by adding the additive to the powder material may satisfy the above-mentioned conditions. When the powder material does not satisfy the above-mentioned conditions, the above-mentioned conditions may be satisfied by adjusting the components of the additives added to the powder material.

From a viewpoint of reducing the particle diameter of the Ni powder, it is preferable that the amount of oxygen in the Ni powder is 2 mass % or more. It is more preferable that the amount of oxygen in the Ni powder is 2.5 mass % or more.

When the amount of oxygen in the Ni powder is excessively large, the crack caused by removing of the binder may occur because the progressing of the removing of the binder caused by the surface oxygen becomes non-negligible. Accordingly, it is preferable that the amount of the oxygen in the Ni powder has an upper limit. It is preferable that the amount of oxygen in the Ni powder is 5.5 mass % or less. It is more preferable that the amount of oxygen in the Ni powder is 4 mass % or less. It is still more preferable that the amount of oxygen in the Ni powder is 3 mass % or less.

When the amount of S with respect to Ni is small, sufficient suppression of oxidizing of the binder may not be necessarily achieved. Accordingly, it is preferable that the amount of S with respect to Ni has a lower limit. For example, it is preferable that the amount of S with respect to Ni is 0.2 mass % or more. It is more preferable that the amount of S with respect to Ni is 0.3 mass % or more. The amount of S with respect to Ni means a weight ratio of S on a presumption that Ni+S is 100 mass %.

When the amount of S with respect to Ni is excessively large, desorption amount of S may become large. Accordingly, it is preferable that the amount of S with respect to Ni has an upper limit. For example, it is preferable that the amount of S with respect to Ni is 0.6 mass % or less. It is more preferable that the amount of S with respect to Ni is 0.5 mass % or less. It is still more preferable that the amount of S with respect to Ni is 0.4 mass % or less.

From a viewpoint of sufficiently suppressing the combustion reaction of S, it is preferable that a weight ratio of S/Sn is 5.5 or less. It is more preferable that the weight ratio of S/Sn is 5 or less.

From a viewpoint of suppressing occurrence of a crack caused by removing of the binder, it is preferable that a weight ratio of O/Sn is 40 or less. It is more preferable that the weight ratio of O/Sn is 30 or less.

From a viewpoint of suppressing appearance of a liquid phase in the internal electrode layer 12, it is preferable that a weight ratio of S/Sn is 0.042 or more. It is more preferable that the weight ratio of S/Sn is 0.08 or more. It is preferable that a weight ratio of O/Sn is 0.39 or more. It is more preferable that the weight ratio of O/Sn is 0.6 or more.

From a viewpoint of suppressing the combustion reaction of S, it is preferable that the amount of Sn with respect to Ni is 0.065 mass % or more. It is more preferable that the amount of Sn with respect to Ni is 0.1 mass % or more. From a viewpoint of suppressing the occurrence of the liquid phase in the internal electrode layer 12 in the firing process, it is preferable that the amount of Sn with respect to Ni is 11 mass % or less. It is more preferable that the amount of Sn with respect to Ni is 6 mass % or less. The amount of Sn with respect to Ni is a weight ratio of Sn on a presumption that Ni+Sn is 100 mass %.

Figure 7A:
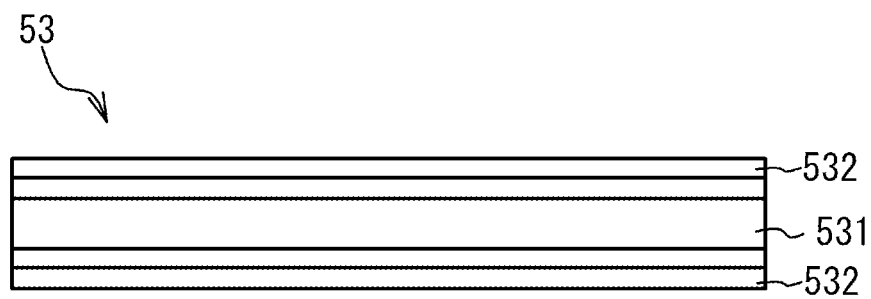
FIG. 7A to FIG. 7C illustrate a positional relationship in an internal electrode pattern.
Figure 7B:
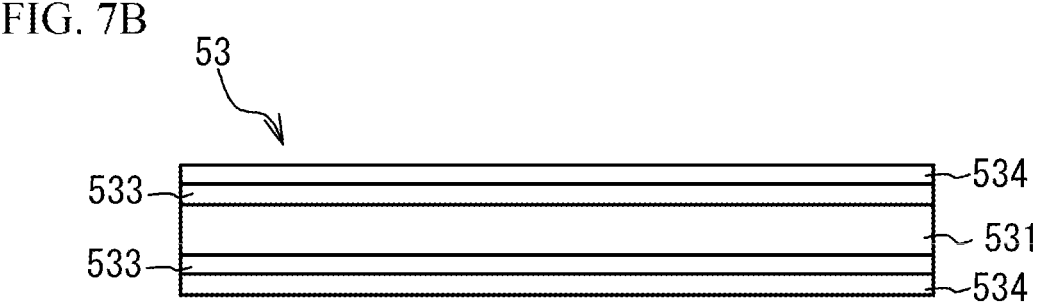
Figure 7C:
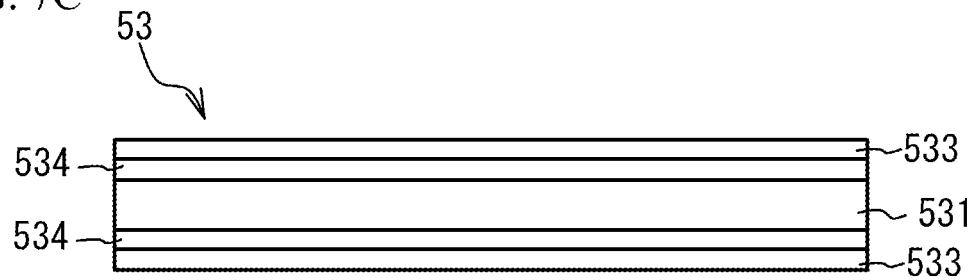

When the internal electrode pattern 53 is formed in the stacking process of FIG. 6A, a high concentration portion 532 is formed on an upper face and a lower face of a Ni pattern 531 as illustrated in FIG. 7A. The S concentration and the Sn concentration of the high concentration portion 532 are higher than those of the Ni pattern 531. Thus, after the firing process, the structure of FIG. 4A is obtained. As illustrated in FIG. 7B, a high S concentration portion 533 having a higher S concentration than the Ni pattern 531 may be formed on the upper face and the lower face of the Ni pattern 531. A high Sn concentration portion 534 having a higher Sn concentration than the high S concentration portion 533 may be formed on each of the high S concentration portion 533 on an opposite side of the Ni pattern 531. In this case, after the firing process, the structure of FIG. 4B is obtained. As illustrated in FIG. 7C, the high Sn concentration portion 534 may be formed on the upper face and the lower face of the Ni pattern 531. And, the high S concentration portion 533 may be formed on each of the high Sn concentration portion 534 on an opposite side of the Ni pattern 531. In this case, after the firing process, the structure of FIG. 4C is obtained.

When the internal electrode pattern 53 is formed of a paste material including Sn, S and Ni, Sn and S are segregated on an interface between the internal electrode layer 12 and the dielectric layer 11. Thus, the structures of FIG. 4A to FIG. 4C are obtained. In this case, the locations of the high Sn concentration portion 534 and the high S concentration portion 533 is adjusted by the weight ratio of Sn and S.

In the manufacturing method of the embodiment, the above-mentioned paste material is used. It is therefore possible to suppress the occurrence of crack and keep the high continuity modulus of the internal electrode layers.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 and 2 and Comparative Example 1

An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. Next, an internal electrode pattern was formed on the dielectric green sheet by printing conductive metal paste.

In the example 1, the internal electrode pattern of FIG. 7B was formed. The internal electrode layer of FIG. 4B was fired. In the example 2, the internal electrode pattern of FIG. 7C was formed. The internal electrode layer of FIG. 4C was fired. In the comparative example 1, only one of S and Sn was added to the paste material for forming the internal electrode layer. The amount of surface oxidized film of the Ni powder of the internal electrode pattern was adjusted by a synthesis condition. The amount of S, the amount of Sn, the position of S, and the position of Sn were adjusted by the amount of the dispersant including S or organic metal complex solution including Sn or an order of adding the dispersant and the organic metal complex solution.

In the component condition No. 1 before firing of the comparative example 1, the amount of surface oxygen with respect to Ni was 2.30 mass %. The amount of S with respect to Ni was 0.00 mass %. The amount of Sn with respect to Ni was 0.10 mass %. The weight ratio of S/Sn was 0.000. The weight ratio of O/Sn was 23.000. In the component condition No. 2 before firing of the comparative example 1, the amount of surface oxygen with respect to Ni was 2.30 mass %. The amount of S with respect to Ni was 0.41 mass %. The amount of Sn with respect to Ni was 0.00 mass %.

In the component condition No. 3 before firing of the examples 1 and 2, the amount of surface oxygen with respect to Ni was 2.50 mass %. The amount of S with respect to Ni was 0.13 mass %. The amount of Sn with respect to Ni was 0.10 mass %. The weight ratio of S/Sn was 1.286. The weight ratio of O/Sn was 24.734. In the component condition No. 4 before firing of the examples 1 and 2, the amount of surface oxygen with respect to Ni was 3.00 mass %. The amount of S with respect to Ni was 0.01 mass %. The amount of Sn with respect to Ni was 0.10 mass %. The weight ratio of S/Sn was 0.099. The weight ratio of O/Sn was 29.681. In the component condition No. 5 before firing of the examples 1 and 2, the amount of surface oxygen with respect to Ni was 2.30 mass %. The amount of S with respect to Ni was 0.41 mass %. The amount of Sn with respect to Ni was 0.10 mass %. The weight ratio of S/Sn was 4.056. The weight ratio of O/Sn was 22.755. In the component condition No. 6 before firing of the examples 1 and 2, the amount of surface oxygen with respect to Ni was 2.56 mass %. The amount of S with respect to Ni was 0.34 mass %. The amount of Sn with respect to Ni was 0.10 mass %. The weight ratio of S/Sn was 3.364. The weight ratio of O/Sn was 25.328. In the component condition No. 7 before firing of the examples 1 and 2, the amount of surface oxygen with respect to Ni was 3.98 mass %. The amount of S with respect to Ni was 0.25 mass %. The amount of Sn with respect to Ni was 0.10 mass %. The weight ratio of S/Sn was 2.473. The weight ratio of O/Sn was 39.376. In the component condition No. 8 before firing of the examples 1 and 2, the amount of surface oxygen with respect to Ni was 2.50 mass %. The amount of S with respect to Ni was 0.13 mass %. The amount of Sn with respect to Ni was 5.89 mass %. The weight ratio of S/Sn was 0.022. The weight ratio of O/Sn was 0.425. In the component condition No. 9 before firing of the examples 1 and 2, the amount of surface oxygen with respect to Ni was 3.00 mass %. The amount of S with respect to Ni was 0.01 mass %. The amount of Sn with respect to Ni was 5.89 mass %. The weight ratio of S/Sn was 0.002. The weight ratio of O/Sn was 0.510. In the component condition No. 10 before firing of the examples 1 and 2, the amount of surface oxygen with respect to Ni was 2.30 mass %. The amount of S with respect to Ni was 0.41 mass %. The amount of Sn with respect to Ni was 5.89 mass %. The weight ratio of S/Sn was 0.070. The weight ratio of O/Sn was 0.391. In the component condition No. 11 before firing of the examples 1 and 2, the amount of surface oxygen with respect to Ni was 2.56 mass %. The amount of S with respect to Ni was 0.34 mass %. The amount of Sn with respect to Ni was 5.89 mass %. The weight ratio of S/Sn was 0.058. The weight ratio of O/Sn was 0.435. In the component condition No. 12 before firing of the examples 1 and 2, the amount of surface oxygen with respect to Ni was 3.98 mass %. The amount of S with respect to Ni was 0.25 mass %. The amount of Sn with respect to Ni was 5.89 mass %. The weight ratio of S/Sn was 0.042. The weight ratio of O/Sn was 0.676. In the component condition No. 13 before firing of the examples 1 and 2, the amount of surface oxygen with respect to Ni was 5.50 mass %. The amount of S with respect to Ni was 0.01 mass %. The amount of Sn with respect to Ni was 5.89 mass %. The weight ratio of S/Sn was 0.001. The weight ratio of O/Sn was 0.934.

470 numbers of the dielectric green sheets on which the internal electrode pattern was formed were stacked, and were fired in a reductive atmosphere. The size of the multilayer chips after firing was 1.0 mm×0.5 mm×0.5 mm. The thickness of each of the dielectric layers was 0.5 μm. The thickness of each of the internal electrode layers was 0.4 μm.

The internal electrode layers after firing were measured by the nano-SIMS. In the example 1, as illustrated in FIG. 4B, the internal electrode layer 12 had the Ni layer 61 in the center portion in the thickness direction, the high S concentration portion 63 on the side of the dielectric layer 11 from the Ni layer 61, and the high Sn concentration portion 64 on side of the dielectric layer 11 from the high S concentration portion 63. In the example 2, as illustrated in FIG. 4C, the internal electrode layer 12 had the Ni layer 61 in the center portion in the thickness direction, the high Sn concentration portion 64 on the side of the dielectric layer 11 from the Ni layer 61, and the high S concentration portion 63 on the side of the dielectric layer 11 from the high Sn concentration portion 64.

With respect to each of the examples 1 and 2 and the comparative example 1, 200 samples were made with respect to each of the component conditions before firing. When the occurrence frequency of crack of the 200 samples was more than 5%, the occurrence frequency of crack of the 200 samples was determined as bad "x". When the occurrence frequency of crack of the 200 samples was 1% or more and 5% or less, the occurrence frequency of crack of the 200 samples was determined as good "A". When the occurrence frequency of crack of the 200 samples was less than 1%, the occurrence frequency of crack of the 200 samples was determined as very good "O". When the average continuity modulus of the internal electrode layer of the 200 samples which was calculated by SEM observation (magnitude factor: 2000, average of 4 visual fields) of a grinded cross section near the center of the chips was less than 65%, the average continuity modulus of the 200 samples was determined as bad "x". When the average continuity modulus of the 200 samples was 65% or more and 75% or less, the average continuity modulus of the 200 samples was determined as good "A". When the average continuity modulus of the 200 samples was more than 75%, the average continuity modulus of the 200 samples was determined as very good "O". Table 1 shows the results.

TABLE 1

| | COMPONENT BEFORE FIRING | | | | | COMPARATIVE SINGLE | | EXAMPLE 1 OUTSIDE | | EXAMPLE 2 INSIDE | |
|---|---|---|---|---|---|---|---|---|---|---|---|
| No. | O mass % | S mass % | Sn mass % | S/Sn | O/Sn | CRACK | CONTINUITY MODULUS | CRACK | CONTINUITY MODULUS | CRACK | CONTINUITY MODULUS |
| 1 | 2.30 | 0.00 | 0.10 | 0.000 | 23.000 | x | x | — | — | — | — |
| 2 | 2.30 | 0.41 | 0.00 | — | — | x | ○ | — | — | — | — |
| 3 | 2.50 | 0.13 | 0.10 | 1.286 | 24.734 | — | — | ○ | Δ | Δ | Δ |
| 4 | 3.00 | 0.01 | 0.10 | 0.099 | 29.681 | — | — | ○ | Δ | Δ | Δ |
| 5 | 2.30 | 0.41 | 0.10 | 4.056 | 22.755 | — | — | ○ | ○ | ○ | ○ |
| 6 | 2.56 | 0.34 | 0.10 | 3.364 | 25.328 | — | — | ○ | ○ | Δ | ○ |
| 7 | 3.98 | 0.25 | 0.10 | 2.473 | 39.376 | — | — | ○ | ○ | Δ | ○ |
| 8 | 2.50 | 0.13 | 5.89 | 0.022 | 0.425 | — | — | ○ | Δ | Δ | Δ |
| 9 | 3.00 | 0.01 | 5.89 | 0.002 | 0.510 | — | — | ○ | Δ | Δ | Δ |
| 10 | 2.30 | 0.41 | 5.89 | 0.070 | 0.391 | — | — | ○ | ○ | ○ | ○ |
| 11 | 2.56 | 0.34 | 5.89 | 0.058 | 0.435 | — | — | ○ | ○ | Δ | ○ |
| 12 | 3.98 | 0.25 | 5.89 | 0.042 | 0.676 | — | — | ○ | ○ | Δ | ○ |
| 13 | 5.50 | 0.01 | 5.89 | 0.001 | 0.934 | — | — | ○ | Δ | Δ | Δ |

The occurrence frequency of crack of the component condition No. 1 before firing of the comparative example 1 was determined as bad "x". It is thought that this was because S was not added, and the crack caused by removing of the binder occurred. The occurrence frequency of crack of the component condition No. 2 before firing of the comparative example 1 was determined as bad "x". It is thought that this was because Sn was not added, and desorption of S was not suppressed.

The occurrence frequency of crack was not determined as bad "x" of all component conditions before firing of the examples 1 and 2. The average continuity modulus was not determined as bad "X" of all component conditions before firing of the examples 1 and 2. It is thought that this was because both S and Sn were added to the internal electrode layers including Ni. The number of the determinations of very good "○" of the example 1 was larger than the number of the determinations of very good "○" of the example 2. It is thought that this was because the high Sn concentration portion was located outer than the high S concentration portion, and the desorption of S was effectively suppressed.

Examples 3 to 22 and Comparative Examples 2 to 32

An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method.

Next, an internal electrode pattern was formed the dielectric green sheet by printing conductive metal paste. An amount of the surface oxygen film of the Ni powder of the conductive metal paste was adjusted by adjusting the synthesis condition. An amount of S and an amount of Sn were adjusted by adding a dispersant including S and an organic metal complex solution including Sn in the making of the paste.

In the example 3, the amount of the surface oxygen with respect to Ni was 2.30 mass %. The amount of S with respect to Ni was 0.41 mass %. The amount of Sn with respect to Ni was 0.10 mass %. The weight ratio of S/Sn was 4.056. The weight ratio of O/Sn was 22.755. In the example 4, the amount of the surface oxygen with respect to Ni was 2.56 mass %. The amount of S with respect to Ni was 0.34 mass %. The amount of Sn with respect to Ni was 0.10 mass %. The weight ratio of S/Sn was 3.364. The weight ratio of O/Sn was 25.328. In the example 5, the amount of the surface oxygen with respect to Ni was 3.98 mass %. The amount of S with respect to Ni was 0.25 mass %. The amount of Sn with respect to Ni was 0.10 mass %. The weight ratio of S/Sn was 2.473. The weight ratio of O/Sn was 39.376. In the example 6, the amount of the surface oxygen with respect to Ni was 2.50 mass %. The amount of S with respect to Ni was 0.55 mass %. The amount of Sn with respect to Ni was 0.10 mass %. The weight ratio of S/Sn was 5.441. The weight ratio of O/Sn was 24.734. In the example 7, the amount of the surface oxygen with respect to Ni was 3.71 mass %. The amount of S with respect to Ni was 0.47 mass %. The amount of Sn with respect to Ni was 0.10 mass %. The weight ratio of S/Sn was 4.670. The weight ratio of O/Sn was 36.705. In the example 8, the amount of the surface oxygen with respect to Ni was 2.30 mass %. The amount of S with respect to Ni was 0.41 mass %. The amount of Sn with respect to Ni was 5.89 mass %. The weight ratio of S/Sn was 0.070. The weight ratio of O/Sn was 0.391. In the example 9, the amount of the surface oxygen with respect to Ni was 2.56 mass %. The amount of S with respect to Ni was 0.34 mass %. The amount of Sn with respect to Ni was 5.89 mass %. The weight ratio of S/Sn was 0.058. The weight ratio of O/Sn was 0.435. In the example 10, the amount of the surface oxygen with respect to Ni was 3.98 mass %. The amount of S with respect to Ni was 0.25 mass %. The amount of Sn with respect to Ni was 5.89 mass %. The weight ratio of S/Sn was 0.042. The weight ratio of O/Sn was 0.676. In the example 11, the amount of the surface oxygen with respect to Ni was 2.50 mass %. The amount of S with respect to Ni was 0.55 mass %. The amount of Sn with respect to Ni was 5.89 mass %. The weight ratio of S/Sn was 0.093. The weight ratio of O/Sn was 0.425. In the example 12, the amount of the surface oxygen with respect to Ni was 3.71 mass %. The amount of S with respect to Ni was 0.47 mass %. The amount of Sn with respect to Ni was 5.89 mass %. The weight ratio of S/Sn was 0.080. The weight ratio of O/Sn was 0.630. In the example 13, the amount of the surface oxygen with respect to Ni was 2.50 mass %. The amount of S with respect to Ni was 0.13 mass %. The amount of Sn with respect to Ni was 0.10 mass %. The weight ratio of S/Sn was 1.286. The weight ratio of O/Sn was 24.734. In the example 14, the amount of the surface oxygen with respect to Ni was 3.00 mass %. The amount of S with respect to Ni was 0.01 mass %. The amount of Sn with respect to Ni was 0.10 mass %. The weight ratio of S/Sn was 0.099. The weight ratio of O/Sn was 29.681. Table 2 and Table 3 show the conditions of the comparative examples 2 to 32.

TABLE 2

| | O [mass %] | S [mass %] | Sn [mass %] | S/Sn | O/Sn | CRACK | CONTINUITY MODULUS |
|---|---|---|---|---|---|---|---|
| COMPARATIVE EXAMPLE 2 | 0.85 | 0.13 | 0.00 | — | — | ○ | x |
| COMPARATIVE EXAMPLE 3 | 0.95 | 0.12 | 0.00 | — | — | ○ | x |
| COMPARATIVE EXAMPLE 4 | 1.74 | 0.17 | 0.00 | — | — | ○ | x |
| COMPARATIVE EXAMPLE 5 | 2.50 | 0.13 | 0.00 | — | — | x | ○ |
| COMPARATIVE EXAMPLE 6 | 3.00 | 0.01 | 0.00 | — | — | x | ○ |
| COMPARATIVE EXAMPLE 7 | 5.50 | 0.01 | 0.00 | — | — | x | ○ |
| COMPARATIVE EXAMPLE 8 | 2.30 | 0.41 | 0.00 | — | — | x | ○ |
| COMPARATIVE EXAMPLE 9 | 2.56 | 0.34 | 0.00 | — | — | x | ○ |

TABLE 2-continued

| | O [mass %] | S [mass %] | Sn [mass %] | S/Sn | O/Sn | CRACK | CONTINUITY MODULUS |
|---|---|---|---|---|---|---|---|
| COMPARATIVE EXAMPLE 10 | 3.98 | 0.25 | 0.00 | — | — | x | ○ |
| COMPARATIVE EXAMPLE 11 | 2.50 | 0.55 | 0.00 | — | — | x | ○ |
| COMPARATIVE EXAMPLE 12 | 3.71 | 0.47 | 0.00 | — | — | x | ○ |
| COMPARATIVE EXAMPLE 13 | 2.56 | 0.34 | 0.06 | 5.605 | 42.204 | x | ○ |
| COMPARATIVE EXAMPLE 14 | 2.50 | 0.55 | 0.06 | 9.067 | 41.215 | x | ○ |
| COMPARATIVE EXAMPLE 15 | 3.71 | 0.47 | 0.06 | 7.781 | 61.163 | x | ○ |
| COMPARATIVE EXAMPLE 16 | 2.30 | 0.41 | 0.06 | 6.759 | 37.918 | x | ○ |
| COMPARATIVE EXAMPLE 17 | 3.98 | 0.25 | 0.06 | 4.121 | 65.614 | x | ○ |
| COMPARATIVE EXAMPLE 18 | 2.50 | 0.13 | 0.06 | 2.143 | 41.215 | x | ○ |
| COMPARATIVE EXAMPLE 19 | 3.00 | 0.01 | 0.06 | 0.165 | 49.458 | x | ○ |
| COMPARATIVE EXAMPLE 20 | 5.50 | 0.01 | 0.06 | 0.082 | 90.673 | x | ○ |
| COMPARATIVE EXAMPLE 21 | 5.50 | 0.01 | 0.10 | 0.049 | 54.415 | x | Δ |
| COMPARATIVE EXAMPLE 22 | 2.30 | 0.41 | 11.43 | 0.036 | 0.201 | ○ | x |
| COMPARATIVE EXAMPLE 23 | 2.56 | 0.34 | 11.43 | 0.030 | 0.224 | ○ | x |
| COMPARATIVE EXAMPLE 24 | 3.98 | 0.25 | 11.43 | 0.022 | 0.348 | ○ | x |
| COMPARATIVE EXAMPLE 25 | 3.71 | 0.47 | 11.43 | 0.041 | 0.324 | ○ | x |
| COMPARATIVE EXAMPLE 26 | 2.50 | 0.55 | 11.43 | 0.048 | 0.219 | ○ | x |
| COMPARATIVE EXAMPLE 27 | 2.50 | 0.13 | 11.43 | 0.011 | 0.219 | ○ | x |
| COMPARATIVE EXAMPLE 28 | 3.00 | 0.01 | 11.43 | 0.001 | 0.262 | ○ | x |
| COMPARATIVE EXAMPLE 29 | 2.50 | 0.13 | 5.89 | 0.022 | 0.425 | ○ | x |
| COMPARATIVE EXAMPLE 30 | 3.00 | 0.01 | 5.89 | 0.002 | 0.510 | ○ | x |
| COMPARATIVE EXAMPLE 31 | 5.50 | 0.01 | 5.89 | 0.001 | 0.934 | ○ | x |
| COMPARATIVE EXAMPLE 32 | 5.50 | 0.01 | 11.43 | 0.000 | 0.481 | ○ | x |

TABLE 3

| | O [mass %] | S [mass %] | Sn [mass %] | S/Sn | O/Sn | CRACK | CONTINUITY MODULUS |
|---|---|---|---|---|---|---|---|
| EXAMPLE 3 | 2.30 | 0.41 | 0.10 | 4.056 | 22.755 | ○ | ○ |
| EXAMPLE 4 | 2.56 | 0.34 | 0.10 | 3.364 | 25.328 | ○ | ○ |
| EXAMPLE 5 | 3.98 | 0.25 | 0.10 | 2.473 | 39.376 | ○ | ○ |
| EXAMPLE 6 | 2.50 | 0.55 | 0.10 | 5.441 | 24.734 | ○ | ○ |
| EXAMPLE 7 | 3.71 | 0.47 | 0.10 | 4.670 | 36.705 | ○ | ○ |
| EXAMPLE 8 | 2.30 | 0.41 | 5.89 | 0.070 | 0.391 | ○ | ○ |
| EXAMPLE 9 | 2.56 | 0.34 | 5.89 | 0.058 | 0.435 | ○ | ○ |
| EXAMPLE 10 | 3.98 | 0.25 | 5.89 | 0.042 | 0.676 | ○ | ○ |
| EXAMPLE 11 | 2.50 | 0.55 | 5.89 | 0.093 | 0.425 | ○ | ○ |
| EXAMPLE 12 | 3.71 | 0.47 | 5.89 | 0.080 | 0.630 | ○ | ○ |
| EXAMPLE 13 | 2.50 | 0.13 | 0.10 | 1.286 | 24.734 | ○ | Δ |
| EXAMPLE 14 | 3.00 | 0.01 | 0.10 | 0.099 | 29.681 | ○ | Δ |

470 numbers of the dielectric green sheets on which the internal electrode pattern was formed were stacked, and were fired in a reductive atmosphere. The size of the multilayer chips after firing was 1.0 mm×0.5 mm×0.5 mm. The thickness of each of the dielectric layers was 0.5 µm. The thickness of each of the internal electrode layers was 0.4 µm.

With respect to each of the examples 3 to 14 and the comparative examples 2 to 32, it was determined whether a crack occurred or not in 200 samples. When the occurrence frequency of crack of the 200 samples was more than 1%, the occurrence frequency of crack of the 200 samples was determined as "bad". When the occurrence frequency of crack of the 200 samples was 1% or less, the occurrence frequency of crack of the 200 samples was determined as very good "⊖".

With respect to each of the examples 3 to 14 and the comparative examples 2 to 32, a continuity modulus of the internal electrode layers of 200 samples was measured. When the average continuity modulus of the internal electrode layer of the 200 samples which was calculated by SEM observation (magnitude factor: 2000, average of 4 visual fields) of a grinded cross section near the center of the chips was less than 70%, the average continuity modulus of the 200 samples was determined as bad "x". When the average continuity modulus of the 200 samples was 70% or more and less than 80%, the average continuity modulus of the 200 samples was determined as good "Δ". When the average continuity modulus of the 200 samples was more than 80%, the average continuity modulus of the 200 samples was determined as very good "○".

The average continuity modulus of the comparative examples 2 to 4 was determined as bad "x". It is thought that this was because the Ni powder had the small surface area (large average particle diameter) in which the amount of the oxygen of the Ni powder was less than 2 mass % with respect to Ni.

The average continuity modulus of the comparative examples 5 to 7 was determined as very good "○". It is thought that this was because the Ni powder had the large surface area (small average particle diameter) in which the amount of the oxygen of the Ni powder was more than 2 mass % with respect to Ni. However, the occurrence frequency of crack of the comparative examples 5 to 7 was determined as bad "x". It is though that this was because the amount of the oxygen was large, the removing of binder was promoted, and the crack caused by the removing of binder occurred.

The occurrence frequency of crack of the comparative examples 8 to 12 was determined as bad "x". It is thought that this was because, although the amount of S with respect to Ni was 0.2 mass % or more, Sn was not added, the combustion reaction of S was not suppressed, and rapid contraction caused by rapid desorption of S occurred.

The occurrence frequency of crack of the comparative examples 13 to 16 was determined as bad "x". It is thought that this was because, even if the amount of S with respect to Ni was 0.2 mass % or more, the amount of Sn was small, the weight ratio S/Sn was more than 5.5, the combustion reaction of S was not suppressed, and rapid contraction caused by rapid desorption of S occurred.

The occurrence frequency of crack of the comparative examples 17 to 22 was determined as bad "x". It is thought that this was because, even if the amount of S with respect to Ni was 0.2 mass % or more, the amount of Sn was small, the weight ratio of O/Sn was more than 40, the progress of removing of binder caused by the surface oxygen was not negligible, and the crack caused by removing of binder occurred.

The occurrence frequency of crack of the comparative examples 22 to 25 was determined as good "○". It is thought that this was because the amount of Sn was large, and the combustion reaction of S was suppressed. However, the average continuity modulus of the comparative examples 22 to 25 was determined as bad "x". It is thought that this was because the amount of Sn was excessively large, the weight ratio of S/Sn was less than 0.042, the weight ratio of O/Sn was less than 0.39, and a liquid phase appeared in the internal electrode layer 12 in the firing process.

The average continuity modulus of the comparative example 26 was determined as bad "x". It is thought that this was because the amount of Sn was excessively large, the weight ratio of O/Sn was less than 0.39, and a liquid phase appeared in the internal electrode layer in the firing process.

The average continuity modulus of the comparative examples 27 and 28 was determined as bad "x". It is thought that this was because the amount of Sn was excessively large, the weight ratio of S/Sn was less than 0.042, the weight ratio of O/Sn was less than 0.39, and a liquid phase appeared in the internal electrode layer 12 in the firing process.

The average continuity modulus of the comparative examples 29 to 32 was determined as bad "x". It is thought that this was because the amount of Sn was excessively large, and the weight ratio of S/Sn was less than 0.042.

In contrast, neither the occurrence frequency of crack nor the average continuity modulus of the examples 3 to 14 was determined as bad "x". It is thought that this was because the amount of the oxygen of the Ni powder with respect to Ni was 2 mass % or more in the paste material, the weight ratio of S/Sn was 0.042 or more and 5.5 or less, and the weight ratio of O/Sn was 0.39 or more and 40 or less.

Although the embodiments of the present invention have been described in detail, it is to be understood that the various change, substitutions, and alterations could be made hereto without departing from the spirit and scope of the invention.

What is claimed is:

1. A ceramic electronic device comprising:
    a multilayer chip in which each of a plurality of dielectric layers of which a main component is ceramic, and each of a plurality of internal electrode layers are alternately stacked,
    wherein the plurality of internal electrode layers include Ni, S and Sn,
    wherein each of the plurality of internal electrode layers includes a Ni layer of which a main component is Ni, in a center portion thereof in a thickness direction,
    wherein each of the plurality of internal electrode layers includes a high Sn concentration portion and a high S concentration portion,
    wherein the high Sn concentration portion has a higher Sn concentration than the Ni layer and is closer to each of the plurality of dielectric layers than the Ni layer, and
    wherein the high S concentration portion has a higher S concentration than the high Sn concentration portion and is closer to each of the plurality of dielectric layers than the high Sn concentration portion.

2. The ceramic electronic device as claimed in claim 1, wherein each of the plurality of internal electrode layers has a thickness of 0.4 µm or less.

3. A manufacturing method of a ceramic electronic device comprising:

forming a plurality of stack units by forming each of a plurality of internal electrode patterns on each of a plurality of dielectric green sheets, the each of the internal electrode patterns being a conductive paste including Sn, S and Ni, the plurality of dielectric green sheets including a ceramic material powder and an organic binder;

forming a multilayer structure by stacking the plurality of stack units; and firing the multilayer structure, wherein each of the plurality of internal electrode patterns includes a Ni pattern of which a main component is Ni, in a center portion thereof in a thickness direction, wherein each of the plurality of internal electrode patterns includes a high Sn concentration portion and a high S concentration portion, wherein the high Sn concentration portion has a higher Sn concentration than the Ni pattern and is closer to each of the plurality of dielectric green sheets than the Ni pattern, and wherein the high S concentration portion has a higher S concentration than the high Sn concentration portion and is closer to each of the plurality of dielectric green sheets than the high Sn concentration portion.

4. The method as claimed in claim 3, wherein the conductive paste includes a Ni powder including Sn, and a S source, wherein an amount of oxygen (O) with respect to Ni in the Ni powder is 2 mass % or more, wherein a weight ratio of S/Sn in the Ni powder is 0.042 or more and 5.5 or less, wherein a weight ratio of O/Sn in the Ni powder is 40 or less.

5. A powder material comprising:

a Ni powder including Sn; and a S source, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

6. The powder material as claimed in claim 5, wherein the oxygen of the Ni powder is an oxygen of a surface oxide of the Ni powder.

7. The powder material as claimed in claim 5, wherein an amount of S with respect to Ni is 0.2 mass % or more.

8. The powder material as claimed in claim 5, wherein an average particle diameter of the Ni powder is 0.01 μm or more and 0.2 μm or less.

9. A paste material comprising:

a Ni powder including Sn; and a S source, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

10. The paste material as claimed in claim 9, wherein the oxygen of the Ni powder is an oxygen of a surface oxide of the Ni powder.

11. The paste material as claimed in claim 9, wherein an amount of S with respect to Ni is 0.2 mass % or more.

12. The paste material as claimed in claim 9, wherein an average particle diameter of the Ni powder is 0.01 μm or more and 0.2 μm or less.

13. A manufacturing method of a ceramic electronic device comprising:

forming a plurality of multilayer units by forming each of internal electrode patterns on each of dielectric green sheets, the each of internal electrode patterns including a Ni powder including Sn and a S source, the each of dielectric green sheet including a ceramic material powder and an organic binder;

forming a multilayer structure by stacking the plurality of multilayer units; and firing the multilayer structure, wherein an amount of oxygen (O) with respect Ni is 2 mass % or more in the Ni powder, wherein a weight ratio of S/Sn is 0.042 or more and 5.5 or less, and wherein a weight ratio of O/Sn is 0.39 or more and 40 or less.

14. The method as claimed in claim 13, wherein the oxygen of the Ni powder is an oxygen of a surface oxide of the Ni powder.

* * * * *